United States Patent
Ramsey et al.

(10) Patent No.: US 8,701,176 B2
(45) Date of Patent: Apr. 15, 2014

(54) INTEGRATED COMPUTER SECURITY MANAGEMENT SYSTEM AND METHOD

(75) Inventors: Jon R. Ramsey, Athens, GA (US); Kevin Ketts, Austell, GA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 13/350,997

(22) Filed: Jan. 16, 2012

(65) Prior Publication Data

US 2012/0117640 A1    May 10, 2012

Related U.S. Application Data

(63) Continuation of application No. 12/001,465, filed on Dec. 11, 2007, now Pat. No. 8,122,495, which is a continuation of application No. 09/949,095, filed on Sep. 7, 2001, now Pat. No. 7,331,061.

(51) Int. Cl.
  *G06F 7/02* (2006.01)

(52) U.S. Cl.
  USPC .............. 726/11; 726/13; 726/22; 726/23; 726/24; 713/188

(58) Field of Classification Search
  USPC ...................... 726/22–24, 11, 13; 713/188
  See application file for complete search history.

(56) References Cited

U.S. PATENT DOCUMENTS

| | | |
|---|---|---|
| 5,606,668 A | 2/1997 | Shwed |
| 5,796,942 A | 8/1998 | Esbensen |
| 5,931,946 A | 8/1999 | Terada et al. |
| 5,956,716 A | 9/1999 | Kenner et al. |
| 5,991,881 A | 11/1999 | Conklin et al. |
| 6,012,088 A | 1/2000 | Li et al. |
| 6,012,100 A | 1/2000 | Frailong et al. |
| 6,088,804 A | 7/2000 | Hill et al. |
| 6,119,109 A | 9/2000 | Muratani et al. |
| 6,119,236 A | 9/2000 | Shipley |
| 6,158,010 A | 12/2000 | Moriconi et al. |

(Continued)

FOREIGN PATENT DOCUMENTS

EP   0 793 170 A1   9/1997
WO   WO 98/26548 A1   6/1998

OTHER PUBLICATIONS

Roesch, Snort—Lightweight Intrusion Detection for Networks, Date Unknown, pp. 1-13.

(Continued)

*Primary Examiner* — Yi-Chen Shaw
(74) *Attorney, Agent, or Firm* — Larson Newman, LLP (57) ABSTRACT

The present disclosure is generally directed to a computer security management system that integrates a firewall with an intrusion detection system (IDS). In other words, the firewall and IDS of the present disclosure can be designed to communicate process or status information and packets with one another. The present disclosure can facilitate centralized control of the firewall and the IDS and can increase the speed at which packets are passed between a secured computer network and an external network. Increased packet processing speed can be achieved in several ways. For example, the firewall and IDS can process packets in series, in parallel, and sometimes singularly when one of the components is not permitted to process a packet. Alternatively, singular processing can also be performed when one component is permitted to pass a packet to the secured computer network without checking with the other component.

20 Claims, 6 Drawing Sheets

(56) References Cited

U.S. PATENT DOCUMENTS

| | | | |
|---|---|---|---|
| 6,226,372 | B1 | 5/2001 | Beebe et al. |
| 6,289,201 | B1 | 9/2001 | Weber et al. |
| 6,301,668 | B1 | 10/2001 | Gleichauf et al. |
| 6,324,692 | B1 | 11/2001 | Fiske |
| 6,353,385 | B1 | 3/2002 | Molini et al. |
| 6,484,315 | B1 | 11/2002 | Ziese |
| 6,499,107 | B1 * | 12/2002 | Gleichauf et al. ............... 726/23 |
| 6,513,122 | B1 | 1/2003 | Magdych et al. |
| 6,519,703 | B1 * | 2/2003 | Joyce ............................. 726/22 |
| 6,530,024 | B1 | 3/2003 | Proctor |
| 6,578,147 | B1 * | 6/2003 | Shanklin et al. ................ 726/22 |
| 6,851,061 | B1 | 2/2005 | Holland et al. |
| 6,880,087 | B1 | 4/2005 | Carter |
| 7,076,650 | B1 | 7/2006 | Sonnenberg |
| 7,260,843 | B2 | 8/2007 | Hentunen |
| 2002/0069356 | A1 * | 6/2002 | Kim .............................. 713/160 |
| 2002/0083344 | A1 | 6/2002 | Vairavan |
| 2002/0166063 | A1 * | 11/2002 | Lachman et al. ............. 713/200 |
| 2003/0108043 | A1 | 6/2003 | Liao |

OTHER PUBLICATIONS

Shipley, ISS RealSecure Remains Ahead, Nov. 15, 1999, pp. 48, 50, 52, 58, 60, 66, 68, Network Computing, Review.
Internet Security Systems, RealSecure Frequently Asked Questions, Nov. 8, 1999, pp. 1-14, http://www.iss.net/prod/tpo/rs.sub.—faq.php3.
Internet Security Systems, Host Security Rating Detail, Nov. 9, 1998, pp. 1-11.
Firewall Features.
Internet Security Systems, Coordinated Attack Single Source, Dec. 2, 1998, p. 1.
Internet Security Systems, RealSecure Frequently Asked Questions, Oct. 29, 1999, pp. 1-14, http://www.iss.net/prod/tpo/rs_faq.php.3.
Internet Security Systems, Information Security: A Changing Need, Oct. 27, 1999, pp. 1-9, http://www.iss.net/about/about.php3.
Internet Security Systems, ISS Ships New Version of RealSecure, Provides Industry-First Solution for Comprehensive E-Business Server Protection, Oct. 29, 1999, pp. 1-3, News Release, http:/www.iss.net/press_rel/pr3.php3.
Internet Security Systems, ISS SAFEsuite products, RealSecure Agent, Oct. 29, 2999, p. 1, http://www.iss.net/prod/rsagent.php3.
Internet Security Systems, ISS SAFEsuite products, RealSecure Manager, Oct. 29, 1999, p. 1, http//www.iss.net/prod/rsmanager.php3.
Internet Security Systems, ISS SAFEsuite products, RealSecure Engine, Oct. 27, 1999, p. 1, http://www.iss.net/prod/rsengine.php3.
Internet Security Systems, ISS SAFEsuite products, Oct. 27, 1999, p. 1, http://www.iss.net/prod/rs.php3.
NFR Intrusion Detection Appliance Version 4.0, Oct. 27, 1999, pp. 1-2, http:www.nfr.net/products/ida-facts.html.
Phillips, NetProwler detects perimeter hack attacks, Jul. 5, 1999, pp. 1-3, Ziff-Davis Publishing Company, Reprinted from PC Week, http://www.zdnet.com/adverts/eprints/axent/pcwk/90803kp.html.
AXENT, Net Prowler Integration Module for the Raptor Firewall 6.x, Oct. 27, 1999, p. 1, http:/www.raptor.com/cs/FAQ/netprowler.html.
AXENT, AXENT Technologies, Inc. Home Page, Oct. 27, 1999, p. 1, http://www.axent.com/.
Network Associates, CyberCop Monitor, Oct. 29, 1999, pp. 1-3, http://www.nai.com/asp_set/products/tns/ccmonitor_features.asp.
Network Security Wizards, Dragon Products, Oct. 29, 1999, p. 1, http://www.securitywizards.com/product.html.
Network Security Wizards, Network Security Wizards Welcome Page, Oct. 27, 1999, p. 1, http://www.securitywizards.com/welcome.html.
Balasubramaniyan et al., An Architecture for Intrusion Detection using Autonomous Agents, Jun. 11, 1998, pp. 1-19, COAST Technical Report 98/05, COAST Laboratory, Purdue University.
Makris, Firewall Services More Bark Than Bite, Mar. 1999, pp. 37-42, 44, 46, 48, and 50, Data Communications, vol. 28, No. 3, XP-000801903.
Haixin, Security Management for Large Computer Networks, 1999, pp. 1208-1213, Network Research Center of Tsinghua University, Beijing, China, XP-002175606.
PR Newswire, eEYE(TM) Digital Security Releases SecureIIS(TM), the Application Firewall for Microsoft IIS Web Server,, May 9, 2001, p. 1.

* cited by examiner

| Firewall Verdict | IDS Available — IDS Verdict | | | IDS NOT Available — Passthru Enabled | | Monitor Mode — IDS Verdict | | | Anti Virus — AntiVirus Verdict | | |
|---|---|---|---|---|---|---|---|---|---|---|---|
|  | Accept | Deny | Reject | Yes | No | Accept | Deny | Reject | Accept | Deny | Reject |
| Accept | Send / IDS | Drop / IDS | Reject / IDS | Send / Firewall | Drop / Firewall | Send / Firewall | Send / Firewall | Send / Firewall | Send / IDS | Deny / IDS | Reject / IDS |
| Deny | Drop / Firewall | Drop / Firewall | Drop / Firewall | Drop / Firewall | Drop / Firewall | Drop / Firewall | Drop / Firewall | Drop / Firewall | Drop / Firewall | Drop / Firewall | Drop / Firewall |
| Reject | Reject / Firewall | Reject / Firewall | Reject / Firewall | Reject / Firewall | Reject / Firewall | Reject / Firewall | Reject / Firewall | Reject / Firewall | Reject / Firewall | Reject / Firewall | Reject / Firewall |
| Trust | Send / Firewall | Send / Firewall | Send / Firewall | Send / Firewall | Send / Firewall | Send / Firewall | Send / Firewall | Send / Firewall | Send / Firewall | Send / Firewall | Send / Firewall |
| Ignore |  |  |  |  | Drop / Firewall |  |  |  |  |  |  |

INTEGRATED COMPUTER SECURITY MANAGEMENT SYSTEM AND METHOD

CROSS REFERENCE TO RELATED APPLICATIONS

This application is a continuation of U.S. patent application Ser. No. 12/001,465 entitled "Integrated Computer Security Management System and Method," filed on Dec. 11, 2007, which is a continuation of U.S. patent application Ser. No. 09/949,095 filed on Sep. 7, 2001 (now U.S. Pat. No. 7,331,061, issued on Feb. 12, 2008), the disclosures of which are hereby expressly incorporated by reference in their entirety.

FIELD OF THE DISCLOSURE

The present disclosure generally relates to a computer security management system that can comprise a firewall integrated with an intrusion detection system (IDS) or an AVS or a combination thereof.

BACKGROUND

Electronic commerce (eCommerce) in today's global economy demands greater access to information and avenues of communication among customers, business partners, suppliers, employees, and friends. Any person or business that uses the Internet to achieve global communication must implement significant safeguards to protect digital information assets available in a secured computer network, or else risk leaving private stores of digital information in the secured computer network vulnerable to intrusion.

Currently, conventional safeguards for secured computer networks typically include stand-alone firewalls manufactured by a first party that can route information to one or more stand-alone intrusion detection systems (IDSs) and one or more anti-virus systems (AVSs). The stand-alone IDSs and AVSs are usually designed by second parties that are not affiliated with the firewall manufacturer. Such a conventional safeguard utilizing a combination of firewalls IDSs and AVSs for a secured computer network typically processes packets of information in either a parallel manner or a serial manner. That is, for serial processing, a packet of information sent to or originating from a secured network 270 can be first processed by a firewall, then processed by an IDS and/or an AVS before the packet is allowed to enter or leave the secured computer network.

Opposite to the serial configuration, another conventional safeguard can be set up such that the stand-alone firewall, the stand-alone IDS, and the stand alone AVS each process the packet at the same time or in a parallel manner. However, regardless of whether a packet is processed in a parallel manner or in a serial manner by a firewall, an IDS, and an AVS, the conventional art typically requires an independent decision from the firewall, the IDS, and the AVS before the packet is allowed to pass into or out of a secured computer network. Such a design that waits for separate processing to be completed by a stand-alone firewall, a stand-alone IDS, and a stand alone AVS consumes invaluable time that is critical to any type of distributed computer network where speed is both a priority and a necessity.

The processing speed of the conventional safeguards can be hampered by the interfaces needed to link stand-alone firewalls and stand-alone IDSs. Since conventional safeguards comprise stand-alone firewalls and stand-alone IDSs are manufactured by different vendors, rather complex interfaces are needed to pass packets entering a firewall destined for an IDS. Further, in such an environment, each stand-alone system, whether it be a firewall or an IDS, will typically have its own packet acquisition engine. Communication between the stand-alone firewalls and the stand-alone IDSs can be achieved through a combination of published application programming interfaces (APIs), industry standard protocols, and high-level scripting languages.

Beneath the APIs needed to connect the firewalls to IDSs are often intricate protocols and networking made by the stand-alone application developers. In addition to requiring rather complex interfaces and communications to be established between stand-alone firewalls, stand-alone IDSs, and stand alone AVSs, conventional systems do not permit simple or rapid upgrades for simultaneous harmonious configuration of both a stand-alone firewall, a stand-alone IDS, and a stand alone AVS. In other words, the conventional art does not promote simple and efficient upgrade configurations to optimize an interfaced security solution that can comprise a stand-alone firewall, a stand-alone IDS, and a stand alone AVS. Often, separate configurations will be required for each stand-alone system because stand-alone systems will typically have different protocols, command languages, and hardware components.

Related to the problems of the rather complex communication interfaces needed between a stand-alone firewall, IDS and AVS is that each stand-alone system is typically unaware of the calculations or decisions made by the opposing stand-alone system. In other words, a stand-alone IDS or AVS are typically not aware of the calculations or decisions made by its complimentary stand-alone firewall. Frequently, a stand-alone IDS or AVS will not receive any information such as packets from a stand-alone firewall if the stand-alone firewall determines that the packet violates one or more of its rules. When packets are not evaluated by each stand-alone system, potential important information about a particular packet may not be discovered by the security manager of a secured computer network because one stand-along system may prevent information from reaching another, respective stand-alone system.

Stated differently, when a stand-alone firewall drops a packet, this packet is typically dropped completely and not forwarded to the stand-alone IDS or AVS. Because the packet is not processed by the stand-alone IDS or AVS, a security manager of a secured computer network may never know or learn that the dropped packet may have also matched an intrusion detection signature or virus. Such a potential match that could be discovered by an IDS or AVS, could be an important element in the evaluation of packets for security threats. For example, it could be determined that a particular packet may be part of a larger security incident such as an integrity attack, a confidentiality attack, a denial of service attack, a multi-stage attack, or another similar attack on the secured computer network from users outside or inside of the secured computer network.

Accordingly, there is a need in the art for a method and system for managing security information for an entire secured computer network. That is, there is a need in the art for a computer security management system that can integrate a firewall with an IDS or AVS or combination thereof. There is also a need in the art for a firewall, an IDS and an AVS that can communicate with each other regarding the process or status information of packets. There is a further need in the art for a firewall, an IDS, and an AVS that can be centrally controlled and that can increase the speed at which packets are passed between a secured computer network and one or more external networks.

An additional need exists in the art for a method and system for managing security information with parallel processing, serial processing, or singular processing by a firewall, an IDS and an AVS that can be selected by a user. A further need exists in the art for a method and system for managing security information where the firewall, IDS and AVS can be configured and optimized efficiently with centralized control.

Similarly, another need exists in the art for a method and system for managing security information that enables a firewall to communicate firewall status information to an IDS and an AVS. A further need exists in the art for a method and system for managing security information such that the firewall can be configurable for situations when the IDS or AVS are unavailable. A further need exists in the art for a method and system for managing security information where the IDS can be configured to perform only passive intrusion detection. An additional need exists in the art for a method and system for managing security information such that the IDS in some instances is not permitted to block packets being communicated through a firewall. And lastly, a further need exists in the art for a method and system for managing security information that comprises a virus scanning device that can function similarly to an IDS and which can be managed centrally along with an IDS and a firewall.

The firewall, IDS, and AVS of the present disclosure can be designed to communicate process or status information and packets with one another. The present disclosure can facilitate centralized control of the firewall, the IDS, and the AVS which can increase the speed at which packets are passed between a secured computer network and an external network. Increased packet processing speed can be achieved in several ways. One way can be to eliminate processing of a packet by the IDS before the packet is sent if a "monitor mode" configuration is selected for the IDS. With such a configuration, the IDS can still process a copy of the packet and can generate an alert if a signature match exists.

Another way to increase speed at which a packet is processed can be to let the firewall interact with the IDS and based on that communication and availability of the IDS, make a decision whether to send a packet to the IDS or the secured network 270. Alternatively, if an "ignore" verdict is reached by the firewall for a given packet being evaluated, then the IDS can be completely ignored. That is, processing by the IDS can be skipped entirely by the firewall and a packet can be sent if it does not violate any firewall rules.

The computer security management system can respond to and track computer security incidents that can be targeted at or that can occur in a networked computer system. Computer security incidents can include, but are not limited to, integrity attacks, confidentiality attacks, denial of service attacks, multi-stage attacks, or other similar attacks on computers or computer networks from users outside or inside of a secured computer network.

Exemplary Architecture

The invention can comprise a computer security management system. More specifically, a computer security management system can comprise a packet acquisition engine, a firewall, an intrusion detection system (IDS), or an AVS, or a combination thereof that receives packets from the firewall in addition to firewall communication(s). A packet can comprise a transmission unit of a fixed maximum size that can comprise binary digits representing both data and a header containing one of an identification number, source and destination addresses, and error-control data.

The packet acquisition engine can be configured to handle multiple sources of information packets. According to one exemplary aspect of the present disclosure, the packet acquisition engine can comprise a bridge that couples the firewall to an information stream such as a connection to a distributed computer network like the Internet. The bridge can comprise a device or hardware such as an Ethernet interface that operates at the International Organization for Standardization Open Systems Interconnection (ISO/OSI) data-link layer, which is the second of seven layers in the ISO/OSI reference model for standardizing computer-to-computer communications.

According to another exemplary aspect of the present disclosure, the packet acquisition engine can comprise the Internet Protocol (IP) layer that is part of the firewall in order to support Network Address Translation (NAT). The IP layer can run at the internetwork layer in the Transfer Connection Protocol over Internet Protocol (TCP/IP) model or the network layer in the ISO/OSI reference model. According to this exemplary aspect, the IDS can perform the network address translation function.

According to various aspects of the present disclosure, the firewall can comprise software or hardware or a combination thereof that is designed to protect a secured computer network from external threats originating from another computer network such as the Internet. The firewall can employ one or more user-defined rules to determine whether a data packet can pass through the firewall. The firewall can prevent unauthorized access to or from a secured computer network.

All messages entering or leaving the secured computer network can pass through the firewall, which examines each message and blocks those that do not meet the specified security criteria contained within the user-defined rules. The firewall of the present disclosure can examine each packet entering or leaving the network and can accept, reject, or deny it based on the user-defined rules.

Similar to the firewall, the intrusion detection system (IDS), and the anti-virus system (AVS) of the present disclosure can comprise software or hardware or a combination thereof that is designed to protect a secured computer network from external threats coming from another computer network such as the Internet. However, the IDS can employ one or more signatures to determine whether a data packet can pass through the intrusion detection system. The IDS can also reject, accept or deny a packet based upon the comparison with the one or more signatures. A signature can comprise all aspects of a packet including header and data, such as an electronic mail message or news posting.

The IDS can differ from a firewall in that the IDS can deploy a more sophisticated rule set to evaluate a potential intrusion. The firewall can limit access between computer networks based on address and some protocol information of a given packet. On the other hand, the IDS can evaluate the entire packet to determine if it contains malicious traffic and generate an alert if necessary. The IDS can watch for attacks that originate from within or outside (or both) of a secured computer network. An integrated firewall and IDS can enhance network security by extending the detection functionality of the IDS to the firewall, and extending the blocking function of the firewall to the IDS.

Exemplary Functions

According to the present disclosure, the firewall can transmit packets and communication comprising firewall status information to the IDS. The firewall status information can comprise decisions made by the firewall with respect to packets based upon a comparison between one or more packets with one or more firewall rules. The firewall can pass packets to the secured computer network immediately, irrespective of any analysis performed by the IDS.

In other words, the firewall can let packets pass into the secured network 270 without waiting for a decision from the IDS. According to this exemplary scenario, packets can be identified as "trusted" based on the header information of that packet. If the firewall detects a "trusted" packet, the packet can be passed immediately through the firewall without waiting for the IDS to process the packet. If a host is not identified as "trusted," the packets can be forwarded to the IDS for processing.

The firewall can also send the packet to the IDS where the IDS can let the packet pass to the secured computer network if certain conditions are met. If the IDS detects a problem with a packet, it can drop that packet and any future versions of the detected problem packet.

According to another exemplary aspect of the present disclosure, the firewall can be configurable for situations when the IDS is unavailable. For example, if the IDS is unavailable, the firewall can be configured to pass a packet if no match occurs when the firewall rule(s) and packet are compared. Alternatively, in a more conservative configuration, the firewall can drop a packet when the IDS is unavailable, even if the packet does not violate any firewall rule(s).

According to a further aspect of the present disclosure, the IDS can operate in a "monitor mode" where the IDS can be configured to perform only passive intrusion detection. When the IDS is in monitor mode, it can be designed to only generate alerts instead of generating alerts and dropping packets. In monitor mode, packets can be passed to a secured computer network only if permitted by the firewall.

For example, while an IDS may detect a signature match with a copy of a packet in monitor mode, the firewall can immediately pass a packet to the secured computer network if the packet does not violate a firewall rule. With monitor mode, the type of information and the amount of information that can potentially be blocked by an IDS can be observed without interrupting a data stream. In this way, context information can be gathered so that adjustments can be made to firewall rules or IDS signatures or both in order to optimize performance of the IDS and firewall.

According to a further exemplary aspect of the present disclosure, the firewall can determine if certain packets should be ignored by the IDS. In other words, the IDS is not permitted to monitor or block packets being communicated to the firewall. If a packet does not violate a firewall rule, the firewall can pass the packet immediately to the secured computer network.

According to another exemplary aspect of the present disclosure, the system can further comprise a virus scanning device that functions similarly to the IDS. The virus scanning device can check a packet against known profiles of existing viruses, worms, trojan horses, and other programs that may cause harm to a computer or that may interrupt computer services. If a packet matches a virus profile, the virus scanning device can recommend the IDS or another appropriate part of the system to drop the packet. The virus scanning device can also operate similarly to the IDS in a "monitor mode" or an "ignore mode" as discussed above with respect to the IDS.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The present disclosure may be embodied in one or more program modules or hardware or a combination thereof that run in a distributed computing environment. The present disclosure may comprise an integrated firewall and intrusion detection system (IDS) that communicate process or status information and packets with one another. The present disclosure can facilitate centralized control of the firewall and the IDS and can increase the speed at which packets are passed between a secured computer network and an external network. Increased packet processing speed can be achieved in several ways. For example, the firewall and IDS can process packets in series, in parallel, and sometimes singularly when one of the components is not permitted to process a packet. Alternatively, singular processing can also be performed when one component is permitted to pass a packet to the secured computer network without checking with the other component.

Illustrative Operating Environment

Although the illustrative embodiment will be generally described in the context of program modules running on a personal computer and a server, those skilled in the art will recognize that the present disclosure may be implemented in conjunction with operating system programs or with other types of program modules for other types of computers. Furthermore, those skilled in the art will recognize that the present disclosure may be implemented in either a stand-alone or in a distributed computing environment or both. In a distributed computing environment, program modules relating to alerting may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

Referring now to the drawings, in which like numerals represent like elements throughout the several Figures, aspects of the present disclosure and the illustrative operating environment will be described.

Figure 1:
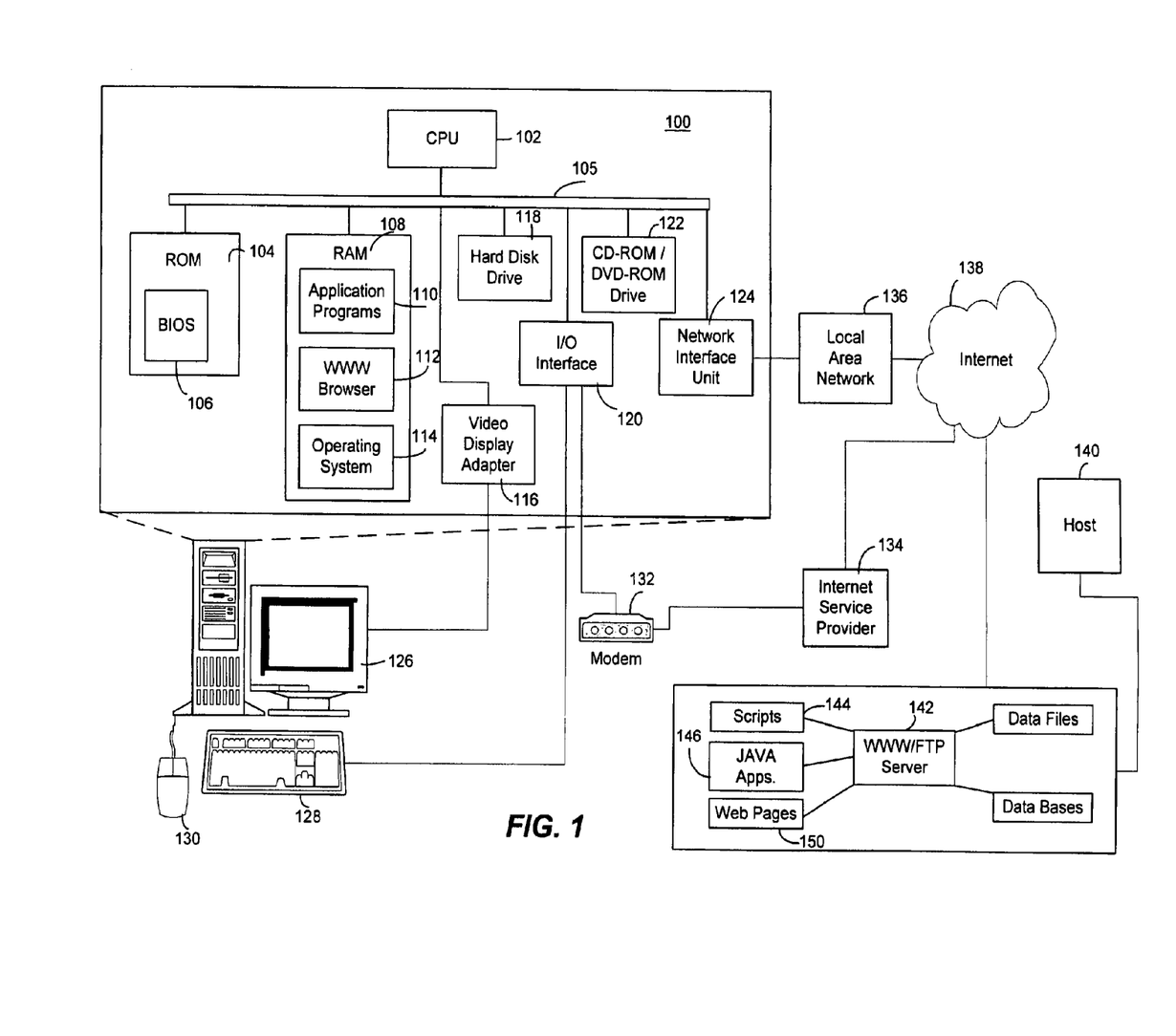
FIG. 1 is a block diagram of a network personal computer that provides the exemplary operating environment for the present disclosure.

FIG. 1 and the following discussion are intended to provide a brief, general description of a suitable computing environment in which the invention may be implemented. Referring now to FIG. 1, an illustrative environment for implementing the invention includes a conventional personal computer 100, including a processing unit 102, a system memory, including read only memory (ROM) 104 and random access memory (RAM) 108, and a system bus 105 that couples the system memory to the processing unit 102. The read only memory (ROM) 104 includes a basic input/output system 106 (BIOS), containing the basic routines that help to transfer information between elements within the personal computer 100, such as during start-up. The personal computer 100 further includes a hard disk drive 118 and an optical disk drive 122, e.g., for reading a CD-ROM disk or DVD disk, or to read from or write to other optical media. The drives and their associated computer-readable media provide nonvolatile storage for the personal computer 100. Although the description of computer-readable media above refers to a hard disk, a removable magnetic disk and a CD-ROM or DVD-ROM disk, it should be appreciated by those skilled in the art that other types of media are readable by a computer, such as magnetic cassettes, flash memory cards, digital video disks, Bernoulli cartridges, and the like, may also be used in the illustrative operating environment.

A number of program modules may be stored in the drives and RAM 108, including an operating system 114 and one or more application programs 110, such as a program for browsing the World-Wide-Web, such as WWW browser 112. Such program modules may be stored on hard disk drive 118 and loaded into RAM 108 either partially or fully for execution.

A user may enter commands and information into the personal computer 100 through a keyboard 128 and pointing device, such as a mouse 130. Other control input devices (not shown) may include a microphone, joystick, game pad, satellite dish, scanner, or the like. These and other input devices are often connected to the processing unit 102 through an input/output interface 120 that is coupled to the system bus, but may be connected by other interfaces, such as a game port, universal serial bus, or firewire port. A display monitor 126 or other type of display device is also connected to the system bus 105 via an interface, such as a video display adapter 116. In addition to the monitor, personal computers typically include other peripheral output devices (not shown), such as speakers or printers. The personal computer 100 may be capable of displaying a graphical user interface on monitor 126.

The personal computer 100 may operate in a networked environment using logical connections to one or more remote computers, such as a host computer 140. The host computer 140 may be a server, a router, a peer device or other common network node, and typically includes many or all of the elements described relative to the personal computer 100. The LAN 136 may be further connected to an internet service provider 134 ("ISP") for access to the Internet 138. In this manner, WWW browser 112 may connect to host computer 140 through LAN 136, ISP 134, and the Internet 138. Such networking environments are commonplace in offices, enterprise-wide computer networks, intranets and the Internet.

When used in a LAN networking environment, the personal computer 100 is connected to the LAN 136 through a network interface unit 124. When used in a WAN networking environment, the personal computer 100 typically includes a modem 132 or other means for establishing communications through the Internet service provider 134 to the Internet. The modem 132, which may be internal or external, is connected to the system bus 105 via the input/output interface 120. It will be appreciated that the network connections shown are illustrative and other means of establishing a communications link between the computers may be used.

The operating system 114 generally controls the operation of the previously discussed personal computer 100, including input/output operations. In the illustrative operating environment, the invention is used in conjunction with Microsoft Corporation's "Windows NT" operating system and a WWW browser 112. However, it should be understood that the invention can be implemented for use in other operating systems, such as Microsoft Corporation's "WINDOWS 3.1," "WINDOWS 95", "WINDOWS 98" and "WINDOWS 2000" operating systems, IBM Corporation's "OS/2" and "AIX operating system", SunSoft's "SOLARIS" operating system used in workstations manufactured by Sun Microsystems, and the operating systems used in "MACINTOSH" computers manufactured by Apple Computer, Inc. Likewise, the invention may be implemented for use with other WWW browsers known to those skilled in the art.

Host computer 140 is also connected to the Internet 138, and may contain components similar to those contained in personal computer 100 described above. Additionally, host computer 140 may execute an application program for receiving requests for WWW pages, and for serving such pages to the requester, such as WWW server 142. WWW server 142 may receive requests for WWW pages 150 or other documents from WWW browser 112. In response to these requests, WWW server 142 may transmit WWW pages 150 comprising hyper-text markup language ("HTML") or other markup language files, such as eXetnsible Markup Language (XML), to WWW browser 112. Likewise, WWW server 142 may also transmit requested data files 148, such as graphical images or text information, to WWW browser 112. WWW server 142 may also execute scripts 144, such as CGI, PERL, ASP, or JSP (Java Server Pages) scripts, to dynamically produce WWW pages 150 for transmission to WWW browser 112. WWW server 142 may also transmit scripts 144, such as a script written in JavaScript, to WWW browser 112 for execution.

Similarly, WWW server 142 may transmit programs written in the Java programming language, developed by Sun Microsystems, Inc., to WWW browser 112 for execution. The WWW server 142 could comprise a UNIX platform running Apache or Netscape webserver. Alternatively, the WWW server 142 could comprise an Internet Information Server (IIS). The present disclosure is not limited to these enumerated examples. Other web server environments are not beyond the scope of the present disclosure.

As will be described in more detail below, aspects of the present disclosure may be embodied in application programs executed by host computer 142, such as scripts 144, or may be embodied in application programs executed by computer 100, such as Java applications 146. Those skilled in the art will also appreciate that aspects of the invention may also be embodied in a stand-alone application program.

Exemplary Computer Architecture

Figure 2:
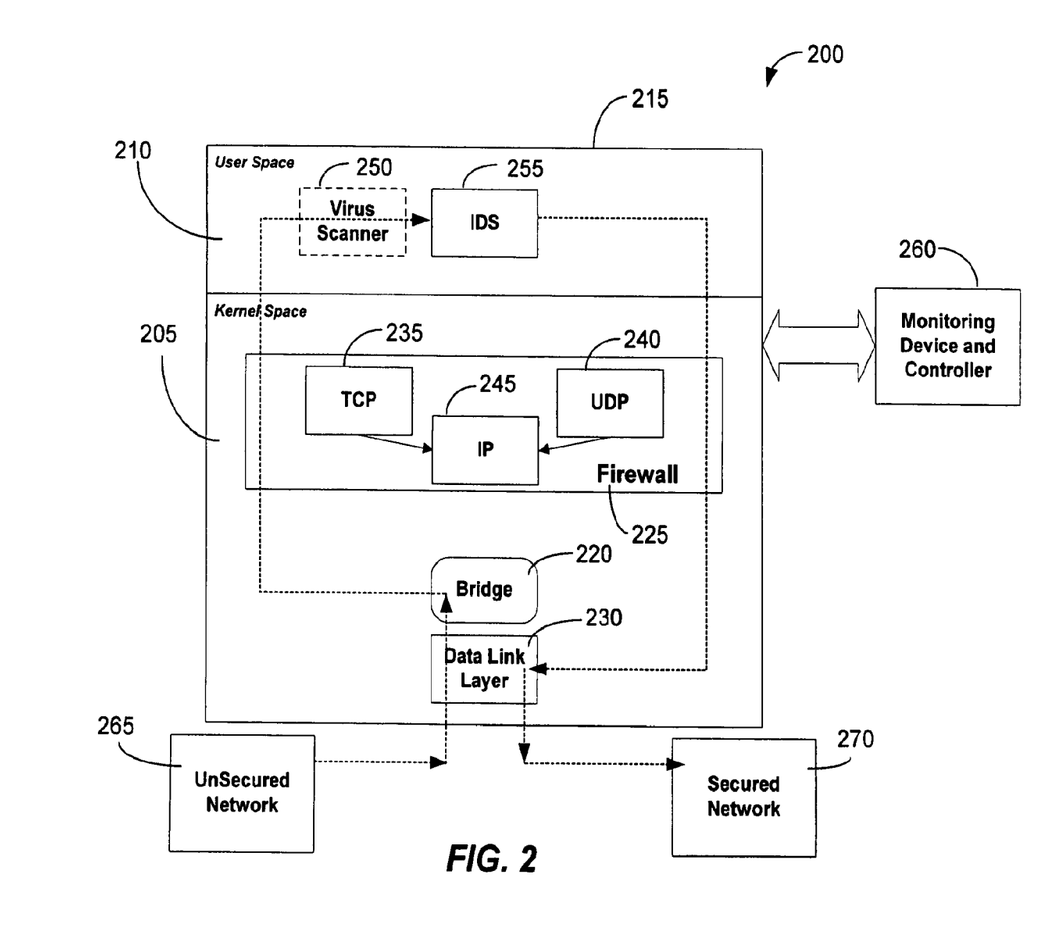
FIG. 2 is a functional block diagram illustrating one exemplary architecture of the present disclosure.

Referring now to FIG. 2, the computer architecture 200 for one exemplary embodiment of the present disclosure will be described. The computer architecture 200 can comprise various software modules or hardware or a combination thereof residing in a kernel space or layer 205 and a user space 210 of an integrated firewall and IDS System 215. Within the kernel space 205, there can reside a bridge 220 that couples a firewall 225 to an information stream that can comprise a data-link layer 230. Those skilled in the art will appreciate that the data-link layer 230 can comprise the second lowest layer in the open systems interconnection seven layer model.

The bridge 220 may comprise a hardware device such as an ethernet interface that operates at the data-link layer. The bridge 220 may operate as the packet acquisition engine for this exemplary embodiment. The bridge 220 can pass packets of information from the data-link layer 230 to the firewall 225. A packet can comprise a transmission unit of a fixed maximum size that can comprise binary digits representing both data and a header containing one of an identification number, source and destination addresses, and error-control data. The firewall 225 can prevent unauthorized access to or from a secured computer network if a data packet violates one or more of the user-defined rules. The present disclosure is not limited to the packet acquisition engine comprising a bridge 220. Other types of packet acquisition engines are not beyond the scope of the present disclosure. As will be discussed below with respect to FIG. 3, the bridge 220 can be removed such that other components of the inventive system perform the acquisition of data packets.

The firewall 225 can comprise software or hardware or a combination thereof that is designed to protect a secured computer network from external threats coming from another computer network such as the Internet. The firewall 225 can employ one or more user-defined rules to determine whether a data packet can pass through the firewall. The firewall 225 can process information by employing different protocols such as transmission control protocol (TCP) 235, user datagram protocol (UDP) 240, and internet protocol (IP) 245. However, the present disclosure is not limited to those protocols illustrated. The present disclosure can further include other protocols that support the internet protocol (IP) 245 as well as protocols that support asynchronous transfer mode (ATM). Those skilled in the art will appreciate that various protocols can be substituted without departing from the scope and spirit of the present disclosure.

The firewall 225 may comprise a dedicated gateway machine with security precautions programmed therein that are used to service an outside network, such as the Internet, dial-in lines, and other connections to a secured network 270. The firewall 225 can run proxy gateways that are located outside of a secured network 270. The proxy gateways or proxy servers can decide whether it is safe to let a particular message or file in the form of a packet to pass into or out of a secured network 270.

The firewall 225 of the present disclosure usually makes one of five determinations about the packets being processed for a secured computer network. The five determinations that can be made with the firewall 225 include the following: whether to "trust" a packet, whether to reject a packet, whether to "ignore" a packet, whether to accept a packet and whether to deny a packet.

The "trusted" determination made by the firewall 225 of the present disclosure relates to one of the important and unique aspects of the present disclosure. The firewall 225 of the present disclosure allows appropriate administrators of a secured network 270 to select sources outside of the secured network 270 that may be considered as "trusted". In other words, according to one exemplary embodiment of the present disclosure, a user of the present disclosure may select certain providers of data that are not considered to be threats to the secured network 270. The firewall 225 or controller 260 may maintain a list of data providers that are considered "trusted" relative to the secured network 270. Therefore, if a packet of information has an identifier indicating that the packet has originated from a trusted source, then the firewall can pass this packet immediately to the secured network 270 without waiting for a decision from the intrusion detection system (IDS) 255. In this way, packet processing speed can be significantly increased.

Another unique and inventive aspect of the present disclosure is that the firewall 225 can further be configured to send a copy of the "trusted" packet to the intrusion detection system (IDS) 255 so that the IDS 255 can determine whether or not the "trusted" packet violates any of the signatures maintained within the IDS 255. In this way, any attacks from a "trusted" data provider can be reported to an appropriate official of the secured computer network.

If the firewall 225 determines that a packet should be rejected, the firewall 225 can transmit a reset packet to the source of the packet indicating that the packet has been rejected by the firewall 225. Similar to the reject determination, the firewall 225 can deny a packet by dropping the packet immediately without forwarding the packet to the secured network 270. However, unlike the reject determination made by the firewall 225, the firewall 225 in the denial determination does not transmit any information back to the source of the packet. In this way, the source of the packet does not know whether the firewall 225 has passed or rejected the packet. Such a feature of not transmitting any information back to the source is desirable because the source of a computer security incident will not know whether the computer security incident (intentional damage) was successful.

Another distinctive and inventive aspect of the present disclosure includes the firewall's 225 ability to determine whether the IDS 255 is available for packet processing. The firewall 225 can be configured such that if the IDS 255 is unavailable for processing a packet, the firewall 225 can then pass the packet to the secured computer network in order to increase the reliability of packet processing. However, the firewall 225 can also be configured such that if the IDS 255 is unavailable, the firewall 225 can then drop the packet in order to prevent any packet matching an intrusion signature from entering the secured network 270 without being checked by the IDS 255. Further details of the IDS availability determination by the firewall 225 will be discussed in further detail below with respect to FIGS. 4 and 5.

The firewall 225 can also be configured according to another inventive and distinguishing feature of the present disclosure. The firewall 225 can determine whether the IDS 255 is in a "monitor" mode. If the firewall 225 determines that the IDS 255 has been placed in a "monitor mode", then the firewall 225 and the IDS 255 can process the packet in parallel, but without waiting for the final determination made by the IDS 255. In other words, in the "monitor" mode, the IDS 255 only performs a passive intrusion detection. That is, the IDS 255 cannot reject or deny a packet if a violation of one or more of its signatures are detected.

In the "monitor" mode, the firewall 225 simply operates as if the firewall 225 was a stand alone application relative to the IDS 255. Further details of the "monitor" mode will be discussed below with respect to FIGS. 4 and 5. The firewall 225 of the present disclosure can also be configured according to yet another unique and inventive aspect of the present disclosure. The firewall 225 can be configured to determine whether the IDS 255 has been placed in an "ignore" mode. As the name of the modes adjust, if the IDS 255 is placed in "ignore" mode, the firewall 225 simply ignores the existence of IDS 255.

That is, if a packet does not violate any of the rules within the firewall 225, the firewall 225 simply passes the packet to the secured network 270 without any evaluation being made by the IDS 255. In this way, the firewall 225 can operate as a stand-alone firewall so that packet processing time can be significantly reduced. However, as apparent to one of ordinary skill in the art, such a feature of the firewall 225 can make a secured network 270 extremely vulnerable to attacks by computers outside of the secured computer network. Accordingly, this feature should be used with extreme caution.

The firewall 225 can pass packets of information and any of the determinations made by the firewall 225. That is, the firewall 225 can communicate to IDS 255 whether a particular packet should be trusted, should be rejected, should be denied, or accepted by a secured computer network.

The IDS 255 can comprise software or hardware or a combination thereof that is designed to protect a secured computer network from external threats coming from other computer networks such as the Internet. The IDS 255 can employ one or more signatures to determine whether a data packet is malicious or contains an attack. Based on the determination of the IDS and verdict of the firewall, the IDS can decide whether to reject or deny a packet 255 A signature can comprise a few lines of information about the sender of an electronic mail message or a news posting. For example, a signature typically comprises a sequence of data used for identification, such as text appended to an e-mail message or a fax.

The IDS 255 can differ from the firewall 225 in that the IDS 255 is designed to look for intrusions in order to stop them from happening. The firewall 225 can limit access between an external or unsecured network 265 and a secured network 270 in order to prevent intrusion. On the other hand, the IDS 255 can evaluate a network traffic using a more sophisticated set of rules and it can generate a signal or an alarm when suspect traffic is identified. The IDS 255 can watch for attacks that originate from within or outside (or both) of a secured computer network. As discussed above, the IDS 255 can be placed in various modes. In the "monitor" mode the IDS 255 can generate alerts if one or more violations of its rules are detected. However, in "monitor" mode the IDS 255 will typically not deny or reject a packet.

Also, the firewall can assign a verdict of "ignore" to a packet and processing of that packet by the IDS 255 can be avoided completely. In other words, a packet with an "ignore" verdict assigned to it by the firewall completely bypasses the IDS 255. In other modes, the IDS 255 can evaluate the verdict assigned by the firewall 225 and the packet contents.

For example, the IDS 255 can determine whether the firewall 225 has deemed a particular packet to be trusted or whether a particular packet should be denied or rejected. If the IDS 255 detects any one of these firewall 225 verdicts, then processing by the IDS 255 stops, as will be discussed in further detail below with respect to FIG. 5. If the firewall accepts a packet, the IDS 255 can determine whether or not the packet should be reset or denied based upon a comparison of the packet with the signatures of the IDS 255. The IDS 255 can reject, deny, or transmit the packet along the data-link layer 230. For a reset determination, the IDS 255 can transmit the reset packet as will be discussed below with respect to FIG. 5.

Prior to packet processing by the IDS 255, the firewall 225 can also send packets to a virus scanner 250. Virus scanner 250 can comprise software or hardware or a combination thereof that is designed to detect and remove computer viruses. The virus scanner 250 is illustrated with dashed lines to indicate that this feature of the present disclosure can be optional. The virus scanner 250 can be configured similar to the IDS 255 in that the virus scanner 250 can be configured to operate in an "ignore" mode or a "monitor" mode. In the "ignore" mode, processing by the virus scanner 250 can be skipped entirely while in the "monitor" mode, the virus scanner can only generate alerts instead of generating alerts and dropping, rejecting, or denying packets.

The integrated firewall and IDS system 215 can be connected to a monitoring device and controller 260. The monitoring device and controller 260 can configure either the IDS 255, the virus scanner 250, or the firewall 225, or any combination thereof. The monitoring device and controller 260 can be designed to receive any alert messages generated by the IDS 255. The monitoring device and controller 260 may comprise one or more software and hardware components. The monitoring device and controller 260 facilitates centralized control of the firewall 225 and the IDS 255 so that updates or configuration changes for either the IDS 255 or firewall 225 or both can be easily implemented without the need for complex application programming interfaces (APIs).

Typical processing of a packet can include the following exchanges of information between components of the integrated firewall and IDS system 215: a packet can be transmitted along the data-link layer 230 where it is acquired by bridge 220. The bridge 220 passes the actual packet to the firewall 225, which evaluates the packet. The packet or a copy of the packet can then be transmitted by the firewall 225 to an optional virus scanner 250. The virus scanner 250 can then pass the packet to the IDS 255 which also makes its own evaluation of the packet. The packet 255 then can be sent by the IDS back to the data-link layer 230 to be sent to the secured computer network. In some instances, depending upon the determination made by the firewall, the firewall 225 can immediately forward the packet to the data-link layer 230 instead of sending the packet immediately to the IDS 255.

Figure 3:
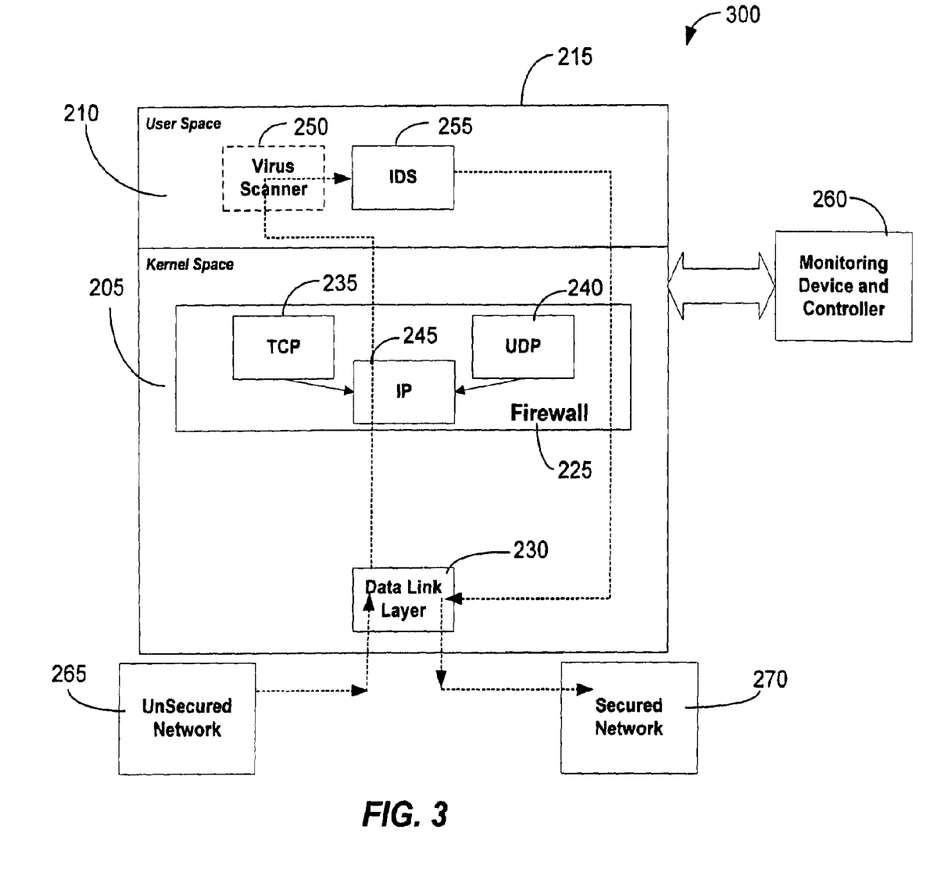
FIG. 3 is a functional block diagram illustrating another exemplary architecture for the present disclosure.

Referring now to FIG. 3, this figure illustrates another exemplary computer architecture 300 according to the present disclosure. Only the differences between FIGS. 2 and 3 will be discussed with respect to FIG. 3. Accordingly, in FIG. 3 the kernel space 205 has been modified where bridge 220 has been removed. In this exemplary embodiment, the packet acquisition engine can comprise the intranet protocol (IP) layer 245 that is part of the firewall 225 in order to support network address translation (NAT). Network address translation refers to the process of converting between IP addresses used within an intranet or other private network (called a stub domain) and Internet IP addresses. This approach makes it possible to use a large number of addresses within the stub domain without depleting the limited number of available numeric Internet IP addresses. In this exemplary embodiment, the IDS 255 can perform the network address translation function. Further, packet acquisition can come from multiple layers and sources.

Figure 4:
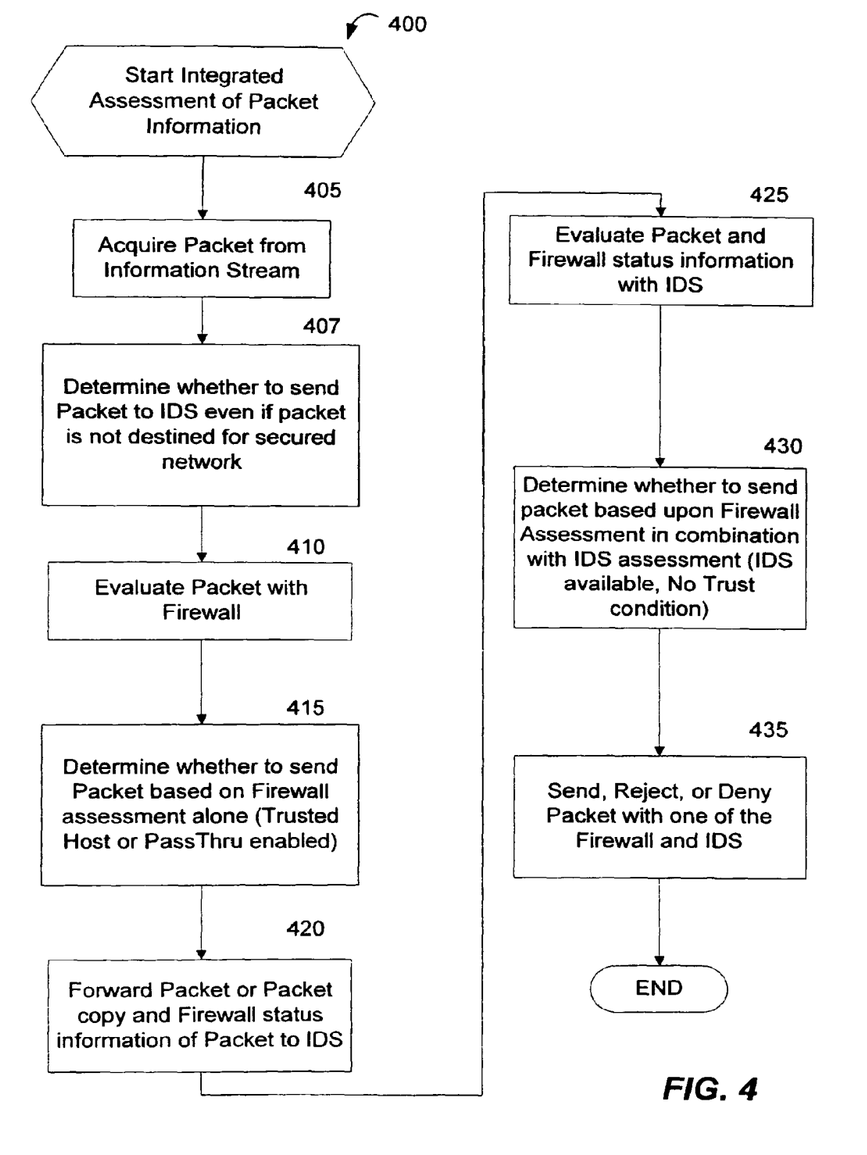
FIG. 4 is a logic flow diagram illustrating an exemplary overview of a method for managing computer security information according to an exemplary embodiment of the present disclosure.

Exemplary Computer-Implemented Process for Managing Computer Security Information Referring now to FIG. 4, this Figure illustrates an exemplary logic flow diagram of a computer implemented process for managing computer security information. More specifically, the logic flow diagram illustrated in FIG. 4 illustrates a computer-implemented process for managing computer security information with an integrated firewall and intrusion detection system (IDS) 255. The logic flow described in FIG. 4 can be the core logic or top level processing and can be executed repeatedly as long as the firewall 225 and IDS 255 are operating. The logic flow diagram illustrated in FIG. 4 illustrates a process that can occur after initialization of the software components illustrated in FIGS. 2 and 3.

Figure 5:
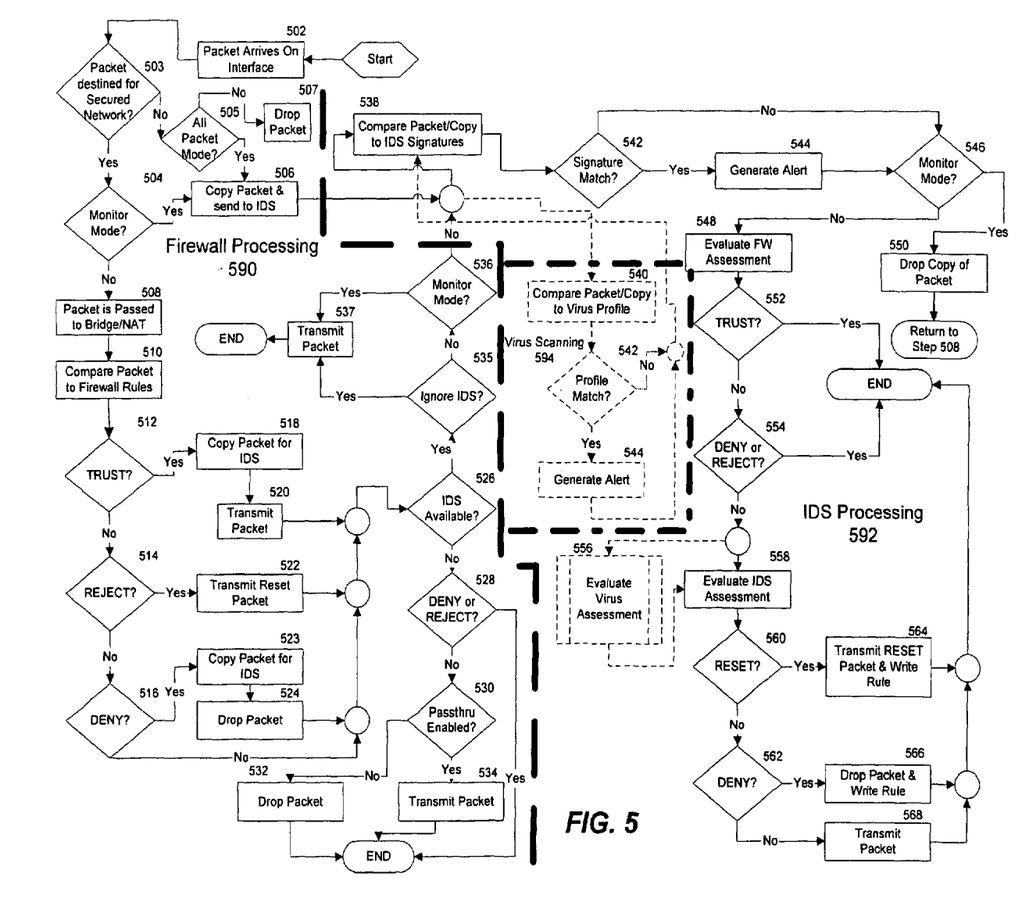
FIG. 5 is another logic flow diagram illustrating an exemplary detailed method for managing computer security information according to an exemplary embodiment of the present disclosure.

For example, in an exemplary object-oriented programming environment, several of the software components or software objects that are required to perform the steps illustrated in FIG. 4 can be initialized or created prior to the process described in FIGS. 4 and 5. Therefore, one of ordinary skill in the art recognizes that several steps pertaining to initialization of the software objects illustrated in FIGS. 2 and 3 may not be illustrated.

The present disclosure includes a computer program, which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining Figures illustrating the program flow.

Certain steps in the processes described below must naturally precede others for the present disclosure to function as described. However, the present disclosure is not limited to the order of the steps described if such order or sequence does not alter the functionality of the present disclosure. That is, it is recognized that some steps may be performed before or after other steps without departing from the scope and spirit of the present disclosure.

Referring back to FIG. 4, this figure provides an overview of the core logic or the top-level processing loop of the integrated computer security management system of the present disclosure where step 405 is the first step of process 400 of an integrated assessment of packet information. In step 405, packet information can be acquired from an information stream. For example, as illustrated in FIG. 2, the packet acquisition engine can comprise a bridge 220 for collecting packets from a data link layer 230. Alternatively, as illustrated in FIG. 3, the packet acquisition engine can comprise the IP protocol 245.

In step 407, it is determined whether the packet is destined for the secured network 270. If the packet is destined for the secured network 270 then it is passed to the firewall 425. But if the packet is not destined for the secured network 270, then the packet could still be passed to the IDS 255 for evaluation. In this way, the IDS 255 could monitor packets that may be destined for other secured networks and the IDS 255 could inform these other secured networks of possible computer threats. Further details of step 407 will be described below with respect to FIG. 5 and the discussion of an "All Packets" monitoring mode.

In step 410, the packet of information is evaluated with the firewall 225. Step 410 can comprise several sub-steps taken by the firewall to determine whether a packet should be "trusted", denied, rejected, or accepted. Further details of step 410 will become apparent from the detailed description of FIG. 5 discussed below.

In step 415, it is determined whether a packet should be sent to the secured network 270 based on the firewall assessment alone. In this step, the firewall 225 may pass one or more packets immediately to the secured network 270 without waiting for the IDS 255 to process the one or more packets if the one or more packets are believe to be "trusted." Also, this step can describe a configuration referred to as "Pass-Thru Enabled." With such a configuration, if the IDS 255 is unavailable, and the firewall deems a particular packet to be acceptable, then the firewall 425 can pass the packet directly to the secured network 270 even though the IDS 255 was deemed unavailable. Step 415 could also describe the configuration referred to as "Pass-Thru Disabled." With such a configuration, if the IDS is unavailable, then the firewall 225 will drop the packet if the firewall 425 deems a packet as acceptable, but not trusted.

In step 420, the packet that was processed by the firewall 225 or a packet copied by the firewall 225 and the firewall status information of the packet are forwarded to the IDS 255. The status information of the packet can comprise decisions made by the firewall with respect to a packet based upon a comparison between the packet and one or more firewall rules. A copy of a packet will typically be made by the firewall 225 if the IDS 255 has been configured for a "monitor mode."

In the "monitor mode" configuration, the IDS 255 can assess packets that have been directly sent by the firewall 225 to the secured network 270.

In step 430, it is determined whether a packet should be sent to a secured computer network based upon a combined firewall and IDS assessment. In this step, it is determined whether a packet has been accepted by the firewall 225 and if the packet has also been accepted by the IDS 255. In this step, the IDS 255 can evaluate the firewall assessment of the packet. If the firewall 225 had considered a packet to be acceptable but not trusted, the IDS 255 can further evaluate its own assessment of the packet. If a packet is acceptable by the IDS 255, it can be sent by the IDS 255 to the secured network 270. Further details of step 430 will become apparent from the detailed discussion of the IDS steps discussed with respect to FIG. 5.

In step 435, a packet is sent, rejected, or denied by either the firewall 225 or IDS 255. This step could describe the scenario when the firewall 225 sends a packet directly without processing of the packet performed by the IDS 255. Alternatively, the step 435 could also describe the situation after a packet has been processed by both the firewall 225 and the IDS 255. Further details of step 435 will become apparent from the detailed description of the method steps relating to the firewall 225 and the IDS 255 as discussed below with respect to FIG. 5.

Referring now to FIG. 5, this figure illustrates a computer-implemented method 500 for managing computer security information with an integrated firewall 225 and IDS 255. The exemplary computer-implemented method 500 begins with step 502 in which a packet arrives on an interface such as the data link layer 230.

In step 503, it is determined whether the packet is destined for the secured computer network 270. If the inquiry to decision step 503 is positive, then the "Yes" branch is followed to step 504. If the inquiry to decision step 503 is negative, then the "No" branch is followed to decision step 505.

In decision step 505, it is determined whether the IDS 255 is set to an "All Packet" mode in which all packets, irrespective of their destination, are evaluated by the IDS 255. If the inquiry to decision step 505 is negative, then the "No" branch is followed to step 507 in which the packet is dropped. If the inquiry to decision step 505 is positive, then the "Yes" branch is followed to step 506. In this way, the IDS 255 can monitor traffic that may be destined for other networks not connected to IDS 255. The IDS 255 can advise these other networks of possible computer threats if a packet matches one or more signatures of the IDS 255.

Such an "All Packet" mode feature is desirable when a large computer network has multiple sub-networks. For example, in a cable modem environment, the IDS 255 may be able to monitor packet traffic that is destined further down the line (for other secured computer networks) relative to the modem in which the IDS 255 is currently connected to. That is, the IDS 255 may be able to monitor packet traffic that are destined for other cable modems that form the links to other secured computer networks (not shown in the figures.)

In decision step 504, it is determined whether the IDS 255 is in a "monitor mode." The IDS 255 can operate in this "monitor mode" where the IDS 255 can be configured to perform only passive intrusion detection. When the IDS 255 is in monitor mode, it can be designed to only generate alerts instead of generating both alerts and blocking or dropping packets of information.

In monitor mode, packets can be passed to a secured computer network only if permitted by the firewall 225. For example, while the IDS 255 may detect a signature match with a copy of the packet while in monitor mode, the firewall 225 can immediately pass a packet to the secured computer network if the packet does not violate a firewall rule. Monitor mode can provide many advantages.

For example, the type of information and the amount of information that can be potentially blocked by the IDS 255 can be observed without interrupting a data stream. In this way, context information can be gathered so that modifications or adjustments can be made to firewall rules or IDS signatures or both in order to optimize performance of both the IDS 255 and firewall 225. Monitor mode is but one unique and distinguishing feature of the present disclosure where the firewall 225 and IDS 255 are optimized.

If the inquiry to decision step 504 is positive, then the "yes" branch is followed to step 506 in which the packet is copied and sent to the IDS 255. In step 506, parallel processing occurs where the IDS 255 processes the copied packet while the actual packet is processed by the firewall 225 as indicated by the two branches flowing out of this step.

If the inquiry to decision step 504 is negative, then the "no" branch is followed to step 508 in which the packet is passed to either the bridge 220 of one exemplary embodiment or the internet protocol layer 245 of another exemplary embodiment. Step 508 describes the functionality of the packet acquisition engine, which can be designed to take packets from the data link layer 230 as described in FIGS. 2 and 3.

Next, in step 510, the packet is compared to the firewall rules. Some of the firewall rules may also include characteristics of packet headers for those packets that may be considered "trusted" by the firewall 225. These lists of "trusted" packets typically correspond to one or more hosts that are considered to pose little or no threat to the secured computer network. The "trusted" packets can be permitted to pass immediately through the firewall 225 to the secured computer network. Such a "trusted" packet feature of the firewall 225 can significantly increase processing speed of packets.

In decision step 512, it is determined whether a packet is "trusted". If the inquiry decision to decision step 512 is positive then the "yes" branch is followed to step 518 in which a packet is copied for use with the IDS 255. In step 520, the firewall 225 transmits the packet to the secured computer network.

If the inquiry to decision step 512 is negative then the "no" branch is followed to decision step 514 in which it is determined whether the packet should be "rejected." If a packet is determined to be rejected by the firewall 225, then such a decision usually means that the packet does violate a firewall rule. However, a rejection decision usually means that the packet has originated from a friendly source. Accordingly, if the inquiry to decision step 514 is positive, then the "yes" branch is followed to step 522 in which a reset packet is transmitted to the source of the packet. In this way, the source receiving the reset packet will be provided information that the original packet was not passed by the firewall 225 into the secured network 270.

Next, in decision step 516, is determined whether a packet should be denied. In other words, the firewall 225 can determine whether a packet should be denied where information concerning this denial is not sent back to the source of the packet. In this way, the source of the packet does not know if the packet has been passed by the firewall 225 to the secured network 270 or if the packet has been dropped by the firewall 225. If the inquiry to decision step 516 is positive, the "yes" branch is followed to step 523 in which a packet is copied for the IDS 255. In step 524, the packet is dropped by the firewall 225. If the inquiry to decision step 516 is negative, where the firewall 225 deems a packet to be acceptable, then the process continues to decision step 526 in which it is determined whether the IDS 255 is available for processing the current packet.

It is noted that steps 518 and 523 exemplify some key optimization features of the present disclosure. These steps enable the integrated firewall and IDS system 200, 300 to process packets very quickly while also permitting all of the components of the system to gather as much information that can be obtained regarding a particular packet. If the inquiry to decision step 526 is "positive" then the "yes" branch is followed to decision step 539 in which it is determined whether the IDS 255 has been placed in a "ignore" mode in which the firewall does not transmit any packets to the IDS 255.

If the inquiry to decision step 526 is negative, then the "no" branch is followed to decision step 528 in which it is determined whether a packet has been denied or rejected by the firewall 225. If the inquiry to step 528 is positive, then the "yes" branch is followed where the process can end. If the inquiry to decision step 528 is negative, then the "no" branch is followed to decision step 530. In decision step 530, it is determined whether the IDS 255 has been placed in a "pass-thru enabled" mode. In such a mode, the firewall 225 will transmit a packet if the IDS 255 is unavailable. In other words, if the inquiry to decision step 530 is positive, then the "yes" branch is followed to step 534 in which the packet is transmitted to the secured network 270. If the inquiry to decision step 530 is negative, then the "no" branch is followed to step 532 in which the packet is dropped by the firewall 225.

Referring back to decision step 535 in which it is determined whether or not the IDS 255 should be ignored by the firewall 225, if the inquiry to this decision step 535 is positive then the "yes" branch is followed to step 537 in which the packet is transmitted by the firewall. As noted above, when the firewall 225 reaches an "ignore" verdict, packets are not sent to the IDS 255. In other words, the IDS 255 is not permitted to monitor or even block packets being communicated to the firewall. If a packet does not violate a firewall rule, the firewall 225 can pass the packet immediately to the secured computer network.

Decision step 526 and its surrounding steps that relate to the availability of the IDS 255, decision step 530 and its surrounding steps that relate to the "Pass-Thru" configuration, and decision step 535 and its surrounding steps that relate to the "Ignore" verdict also exemplify other key and unique optimizations that distinguish the present disclosure from the conventional art. All of these steps provide optimizations that either cannot be achieved with conventional stand-alone firewalls and IDSs or they are too difficult to implement.

If the inquiry to the decision step 535 is negative, then the "no" branch is followed to decision step 536 in which it is determined whether or not the IDS 255 has been placed in a "monitor mode". As noted above, when the IDS 255 is operating in the "monitor mode", the IDS 255 can be configured to perform only passive intrusion detection. The IDS 255 in this mode only generates alerts instead of generating both alerts and blocking or dropping packets. In this way, valuable information can be collected on packets without slowing the processing of the packets by the firewall 225.

In "monitor mode", packets can be passed to a secured computer network only if permitted by the firewall. In this mode, the firewall 225 does not wait for any decisions made by the IDS 255 with respect to packets. Such a "monitor mode" feature is yet another unique and inventive aspect that permits context information to be collected about packets. This context information can later be analyzed as part of a forensic analysis or the information can provide insight in how to optimize IDS signatures and firewall rules for certain types of network traffic. If the inquiry to decision step 536 is positive, then the "yes" branch is followed to step 537 in which the packet is transmitted to the secured network 270. If the inquiry to decision step 536 is negative, then the "no" branch is followed to step 538 in which either the actual packet or a copy of the packet is compared to IDS signatures on file.

Instead of proceeding directly from decision step 536 to step 538, the process could first proceed to step 540 in which the packet or copy of the packet is compared to a virus profile in step 540. In decision step 542 it can be determined whether a packet or a copy of a packet matches the profile of a virus. If the inquiry to decision step 542 is positive, then the "yes" branch can be followed to step 544 in which an alert is generated with the virus scanner 250.

If the inquiry to decision step 542 is negative, then the "no" branch is followed back to step 538. Steps 540-544 are illustrated with dashed lines to indicate that the virus scanner 250 is but one optional component of the present disclosure.

In decision step 542, it is determined whether a packet matches a signature on an intrusion detection list. Basically, in decision step 542, it is determined whether or not a packet matches one or more signatures stored in or that are accessible by IDS 255. If the inquiry to decision step 542 is positive then the "yes" branch is followed to step 544 in which the IDS 255 generates an alert.

If the inquiry to decision step 542 is negative, then the "no" branch is followed to decision step 546 in which it is determined whether or not the IDS 255 is in a monitor mode. If the inquiry to decision step 546 is positive, then the "yes" branch is followed to step 550 in which the copy of the packet is dropped by the IDS 255. The process then returns to step 508 in which the packet is passed to either the bridge 220 or the IP layer 245 functioning as the packet acquisition engine.

If the inquiry to decision step 546 is negative, then the "no" branch is followed to step 548 in which the IDS 255 evaluates the firewall assessment of a particular packet. In decision step 552, the IDS 255 determines whether the firewall 225 considered the packet as being "trusted." If the inquiry to decision step 552 is positive, then the "yes" branch is followed. If the inquiry to decision step 552 is negative, then the "no" branch is followed to decision step 554 determines whether the packet has been denied or rejected by the firewall 225. If the inquiry to decision step 554 is positive, then the "yes" branch is followed.

It is noted that decision steps 552 and 554 are further additional aspects which define the present disclosure over the conventional art, since it is in these steps that the IDS 255 evaluates the firewall communication that was forwarded to the IDS 255. As noted above, many conventional IDS systems do not receive information regarding processing such as decisions made by the firewall 225. Decision steps 552 and 554 take in account for the immediate processing of the firewall in steps 518, 522 and 524. In other words, decision steps 552 and 554 enable more rapid processing by the IDS since it is at this stage of processing in which the IDS 255 determines that the current packet has been completely processed by the firewall 225 in that further processing by the IDS 255 is unnecessary. With such a process that considers work already performed by one system component, unnecessary or redundant processing is eliminated, which in turn increases the processing speed for individual system components such as the IDS 255 as well as the system as a whole.

If the inquiry to decision step 554 is negative, then the "no" branch is followed to step 558 in which the IDS 255 evaluates its own assessment of the current packet. It is noted that in the optional embodiment, which comprises a virus scanner 250, instead of proceeding directly to step 558 from decision step 554, the process could proceed to routine 556 in which the virus assessment is evaluated by the IDS 255. Routine 556 would comprise steps similar to steps 558, 560 and 562, as will be discussed in further detail below.

In step 558, the IDS 255 evaluates its own assessment of the current packet. If the current packet has a signature match and is from a signature that is recognized to be a friendly source, then the "yes" branch is followed to step 564 in which a recent packet is transmitted by the IDS back to the source of the packet. Also, in step 564, the IDS 255 can generate and write a rule to the firewall 225 relating to the current packet being evaluated. If the inquiry to decision step 560 is negative, then the "no" branch is followed to decision step 562 in which it is determined whether the current packet should be denied. If the inquiry to decision step 562 is positive, then the "yes" branch is followed to step 566 in which the packet is dropped by the IDS. Also, in step 566, the IDS 255 can generate and write a rule to the firewall 225 relating to the current packet being evaluated. If the inquiry to decision step 562 is negative, then the "no" branch is followed to step 568 in which the packet is transmitted by the IDS 255 to the secure network.

In FIG. 5, a main dashed line separates the process into three sections. The first section 590 denotes the steps that can be performed by the firewall 225 in one exemplary embodiment. The second section 592 denotes the steps of the process that can be performed by the IDS 255. The third section 594 completely enclosed by dashed lines denotes the steps of the process that can be performed by the virus scanner 250.

As will become apparent from the process described in FIG. 5 above, the present disclosure permits very unique and inventive configurations for increasing packet processing speeds for the firewall 225 or the IDS 255 or both. The process described in FIG. 5 yields significant optimizations that are also illustrated in FIG. 6.

Figure 6:
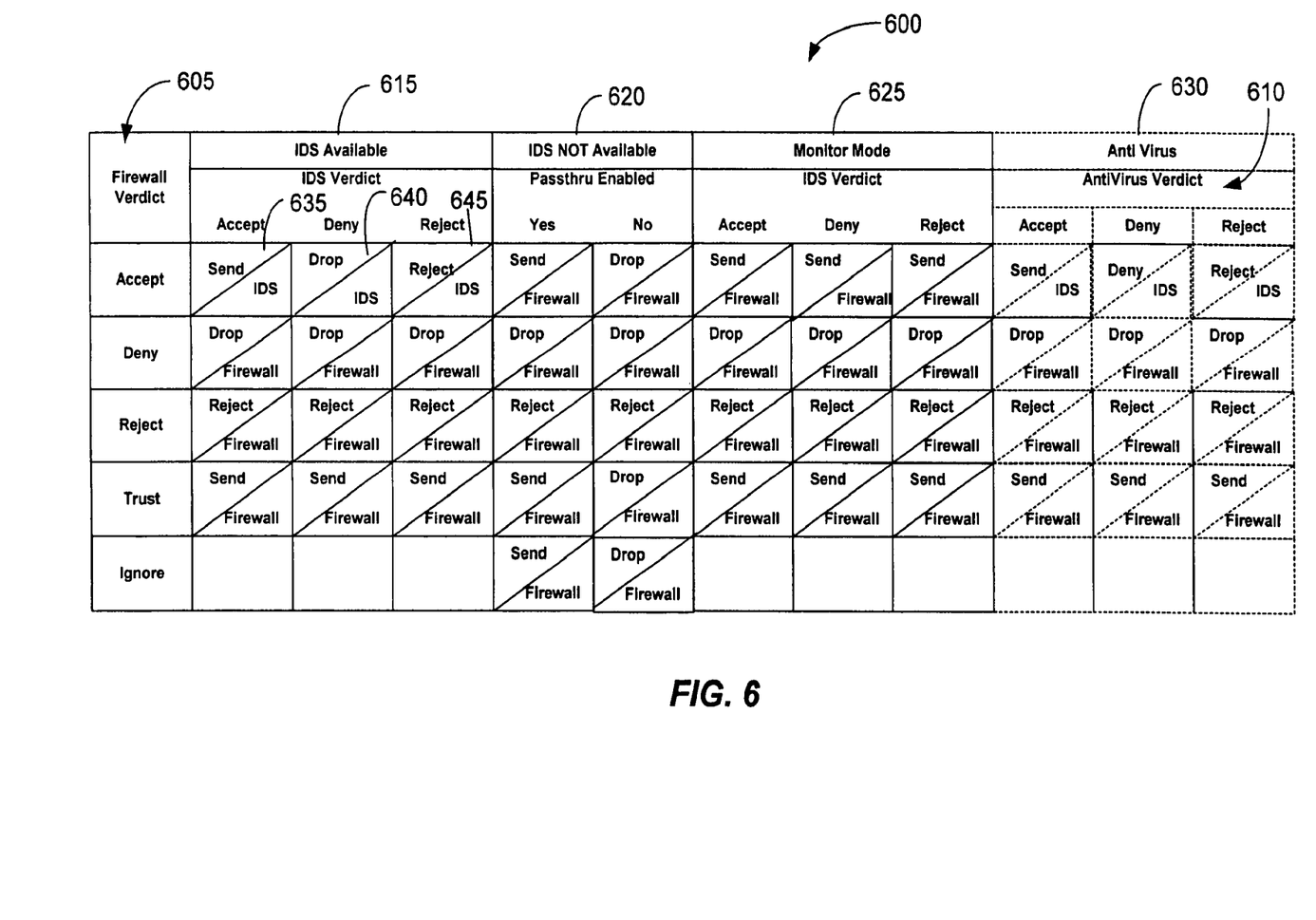
FIG. 6 is a chart illustrating various exemplary states of the integrated computer security management system according to one exemplary embodiment of the present disclosure.

Referring now to FIG. 6, this figure illustrates very exemplary states of the integrated computer security management system according to one exemplary embodiment of the present disclosure. FIG. 6 comprises a decision matrix 600 that reflects how packets are processed when the firewall 225 and the IDS 255 are placed in various configurations. The first column 605 describes various decisions that can be rendered by the firewall 225 while the first row 610 illustrates decisions that can be rendered by the IDS 255 as well as various configuration states for the IDS and the virus scanner 250.

The first section 615 of the decision matrix 600 describes the configuration where the IDS 255 is available for processing a packet that is also being processed by the firewall 225. Section 620 of the decision matrix 600 describes the configuration in which the IDS 255 is not available for processing a packet that is also processed by the firewall 255. Section 625 of the decision matrix 600 describes the configuration in which the IDS is placed in a "monitor mode." Section 630 of decision matrix 600 further describes the states of the virus scanner 250 based upon a comparison of a packet to one or more virus profiles.

Each section of the decision matrix 600 demonstrates the various optimizations that can be achieved for the present disclosure. For example, in the first decision block 635 of the decision matrix 600, the top half or left side section indicates the combined decision of the firewall 225 and the IDS 255 while the lower half or right side section of the block indicates which device will be handling the current packet. Therefore decision block 635 indicates that the firewall 225 and the IDS 255 have accepted the packet such that it will be sent by the IDS 255 (as indicated by the lower half of the block 535). In the second block 640, the overall decision for the current packet is to drop and the IDS 255 will drop the current packet. In the third block 645, the firewall 255 has accepted the current packet while the IDS 255 has rejected the packet. But since the packet is from a friendly or known source, the IDS 255 transmits the reset packet back to the source of the packet.

The decision matrix 600 demonstrates the efficiency achieved with the integrated firewall and IDS system 200, 300 of the present disclosure. The majority of the blocks indicate that the firewall manages many of the packets in most of the configurations. That is, if the firewall 225 denies, rejects, or trusts a packet, then the firewall typically can process a particular packet immediately without waiting for the IDS 255 to process the packet. In this way, packet processing is significantly improved with the present disclosure since the packet processing speed can be substantially increased.

It should be understood that the foregoing relates only to illustrative embodiments of the present disclosure, and that numerous changes may be made therein without departing from the spirit and scope of the invention as defined by the following claims.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving at a computer security device a first indication from a firewall that a first packet is accepted based upon a first firewall rule, wherein the firewall is different from the computer security device;
    in response to receiving the first indication and in response to the computer security device being in an available mode, determining by the computer security device whether to send the first packet based on the first indication and on a first evaluation by the computer security device, wherein processing by the firewall and by the computer security device are performed in parallel;
    in further response to receiving the first indication and in response to the computer security device being in a monitor mode, sending the first packet without waiting for the first evaluation and collecting by the computer security device data about the first packet;
    receiving at the computer security device a second indication from the firewall that a second packet is trusted, wherein the second packet is determined by the firewall to be trusted by identifying a source of the second packet, comparing the identified source to a predetermined list, and if the identified source matches a source on the list, designating the second packet as trusted and originating from a trusted data provider;
    in response to receiving the second indication, sending the second packet without waiting for a second evaluation by the computer security device and irrespective of the second evaluation made by the computer security device;
    determining at the computer security device whether the second packet matches a signature in the computer security device; and in response to determining that the second packet matches the signature, modifying the predetermined list to designate future packets from the source of the second packet as un-trusted and originating from an un-trusted data provider.

2. The method of claim 1, wherein the computer security device comprises an intrusion detection system.

3. The method of claim 1, wherein determining by the firewall whether the second packet should be deemed trusted comprises comparing the second packet with a second firewall rule.

4. The method of claim 1, further comprising:
copying the second packet; and
forwarding the copy of the second packet to the computer security device.

5. The method of claim 1, further comprising:
receiving at the computer security device a third indication that a third packet violates a third rule of the firewall; and
in response to receiving the third indication, dropping the third packet.

6. The method of claim 1, further comprising:
evaluating the second packet with a virus scanning device.

7. The method of claim 1, further comprising:
determining that a third packet is destined for a secured computer network; and
in response to determining that the third packet is destined for a secured computer network, sending the third packet to the secured computer network and to the computer security device.

8. The method of claim 1, further comprising:
receiving at the computer security device a third indication that a third packet is rejected by the firewall; and
receiving at the computer security device a fourth indication that a fourth packet is denied by the firewall.

9. A non-transitory computer-readable medium comprising code for carrying out a method, the method comprising:
receiving at a computer security device a first indication from a firewall that a first packet is accepted based upon a first firewall rule, wherein the firewall is different from the computer security device;
in response to receiving the first indication and in response to the computer security device being in an available mode, determining by the computer security device whether to send the first packet based on the first indication and on a first evaluation by the computer security device, wherein the processing by the firewall and by the computer security device are performed in parallel;
in further response to receiving the first indication and in response to the computer security device being in a monitor mode, sending the first packet without waiting for the first evaluation and collecting by the computer security device data about the first packet;
receiving at the computer security device a second indication from the firewall that a second packet is trusted, wherein the second packet is determined by the firewall to be trusted by identifying a source of the second packet, comparing the identified source to a predetermined list, and if the identified source matches a source on the list, designating the second packet as trusted and originating from a trusted data provider;
in response to receiving the second indication, sending the second packet without waiting for a second evaluation by the computer security device and irrespective of the second evaluation made by the computer security device; and determining at the computer security device whether the second packet matches a signature in the computer security device; and
in response to determining that the second packet matches the signature, modifying the predetermined list to designate future packets from the source of the second packet as un-trusted and originating from an un-trusted data provider.

10. The computer-readable medium of claim 9, the method further comprising:
copying the second packet; and
forwarding the copy of the second packet to the computer security device.

11. The computer-readable medium of claim 9, the method further comprising:
receiving at the computer security device a third indication that a third packet violates a third rule of the firewall; and
in response to receiving the third indication, dropping the third packet.

12. The computer-readable medium of claim 9, the method further comprising:
determining that a third packet is destined for a secured computer network; and
in response to determining that the third packet is destined for a secured computer network, sending the third packet to the secured computer network and to the computer security device.

13. The computer-readable medium of claim 9, the method further comprising:
receiving at the computer security device a third indication that a third packet is rejected by the firewall; and
receiving at the computer security device a fourth indication that a fourth packet is denied by the firewall.

14. An intrusion detection system comprising:
a memory; and
a processor for executing code stored in the memory, and operable to at least:
inform a firewall that the intrusion detection system is in an available mode for packet processing;
in response to informing the firewall that the intrusion detection system is in the available mode, to:
receive a first indication from the firewall that a first packet is accepted based upon a first firewall rule, wherein the firewall is different from the intrusion detection system and processing by the firewall and by the computer security device are performed in parallel;
in response to receiving the first indication, determine whether to send the first packet based on the first indication and on a first evaluation by the intrusion detection system;
receive a second indication from the firewall that a second packet is trusted; and
in response to receiving the second indication:
send the second packet without waiting for a second evaluation by the intrusion detection system;
determine whether the second packet matches a signature in the intrusion detection system; and
in response to determining that the second packet matches the signature, modify a predetermined list of the firewall to designate future packets from a source of the second packet as un-trusted and originating from an un-trusted data provider;
inform the firewall that the intrusion detection system is in a monitor mode; and
in response to informing the firewall that the intrusion detection system is in the monitor mode:

receive a third indication from the firewall that a third packet is accepted based upon a third firewall rule; and in response to receiving the third indication:
send the third packet without waiting for a third evaluation; and
collect data about the third packet.

15. The intrusion detection system of claim 14, wherein determining by the firewall whether the second packet should be deemed trusted comprises comparing the second packet with a second firewall rule.

16. The intrusion detection system of claim 14, the processor further operable to:
copy the second packet; and
forward the copy of the second packet to the computer security device.

17. The intrusion detection system of claim 14, the processor further operable to:
receive at the computer security device a third indication that a third packet violates a third rule of the firewall; and
in response to receiving the third indication, drop the third packet.

18. The intrusion detection system of claim 14, the processor further operable to:
evaluate the second packet with a virus scanning device.

19. The intrusion detection system of claim 14, the processor further operable to:
determine that a third packet is destined for a secured computer network; and
in response to determining that the third packet is destined for a secured computer network, send the third packet to the secured computer network.

20. The intrusion detection system of claim 14, the processor further operable to:
receive a third indication that a third packet is rejected by the firewall; and
receive a fourth indication that a fourth packet is denied by the firewall.

* * * * *